July 24, 1951     D. E. MARSHALL     2,561,394
METHOD OF COATING PARTICULATE MATERIALS
Filed March 16, 1946     5 Sheets-Sheet 1
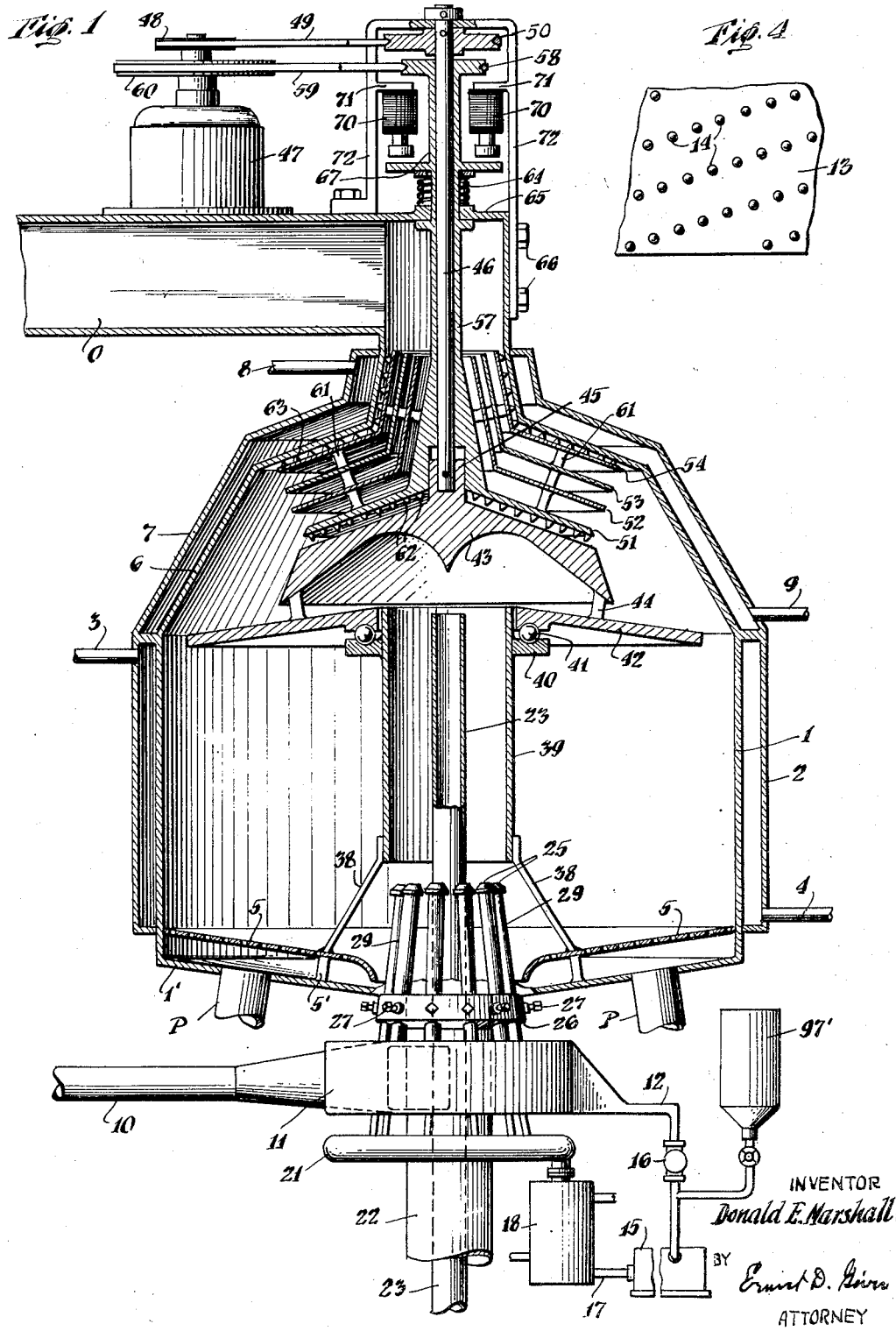
INVENTOR
Donald E. Marshall
BY
Ernest D. Given
ATTORNEY

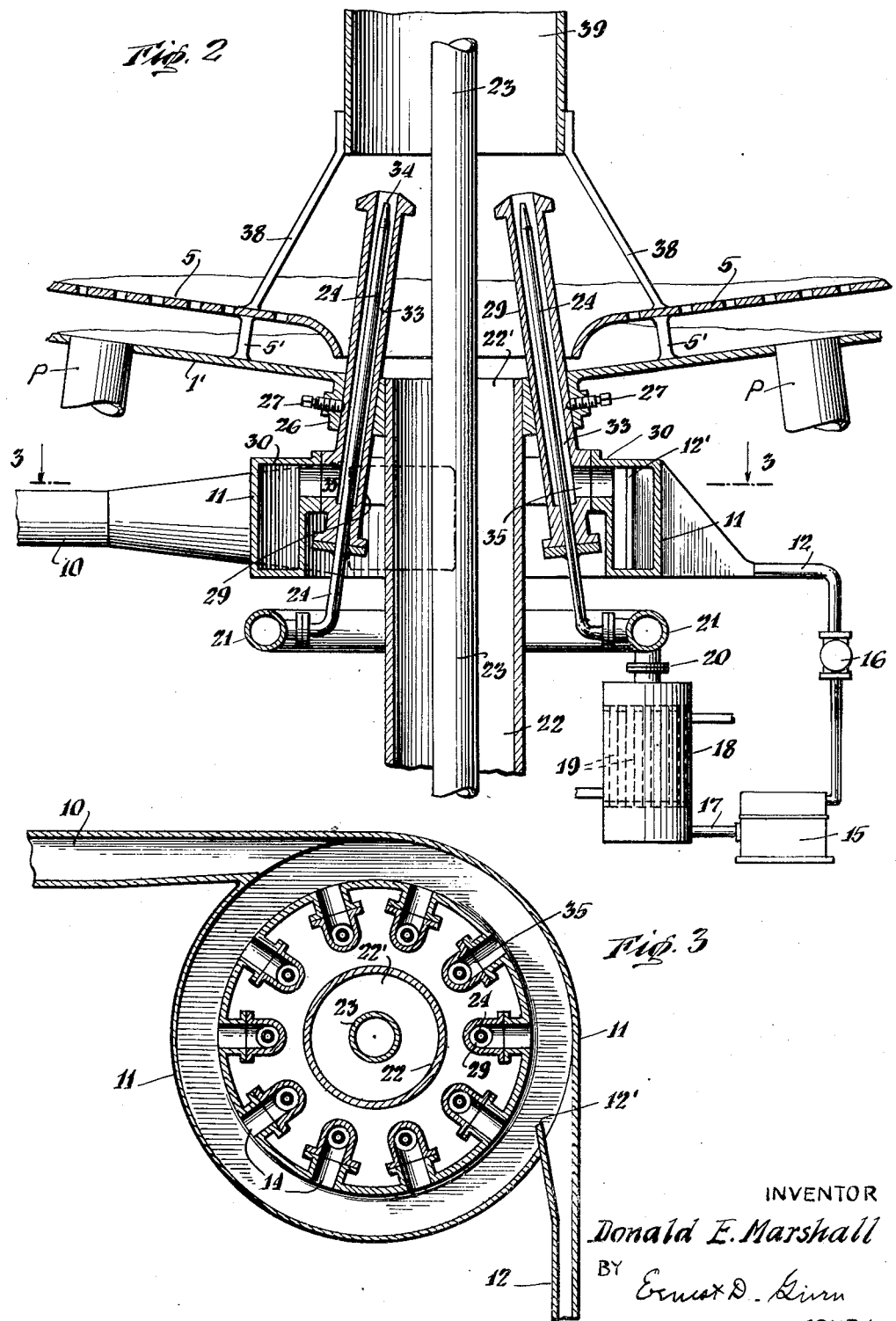

July 24, 1951

D. E. MARSHALL 2,561,394

METHOD OF COATING PARTICULATE MATERIALS

Filed March 16, 1946

INVENTOR
Donald E. Marshall
BY
Ernest D. Given
ATTORNEY

July 24, 1951     D. E. MARSHALL     2,561,394
METHOD OF COATING PARTICULATE MATERIALS
Filed March 16, 1946     5 Sheets-Sheet 4
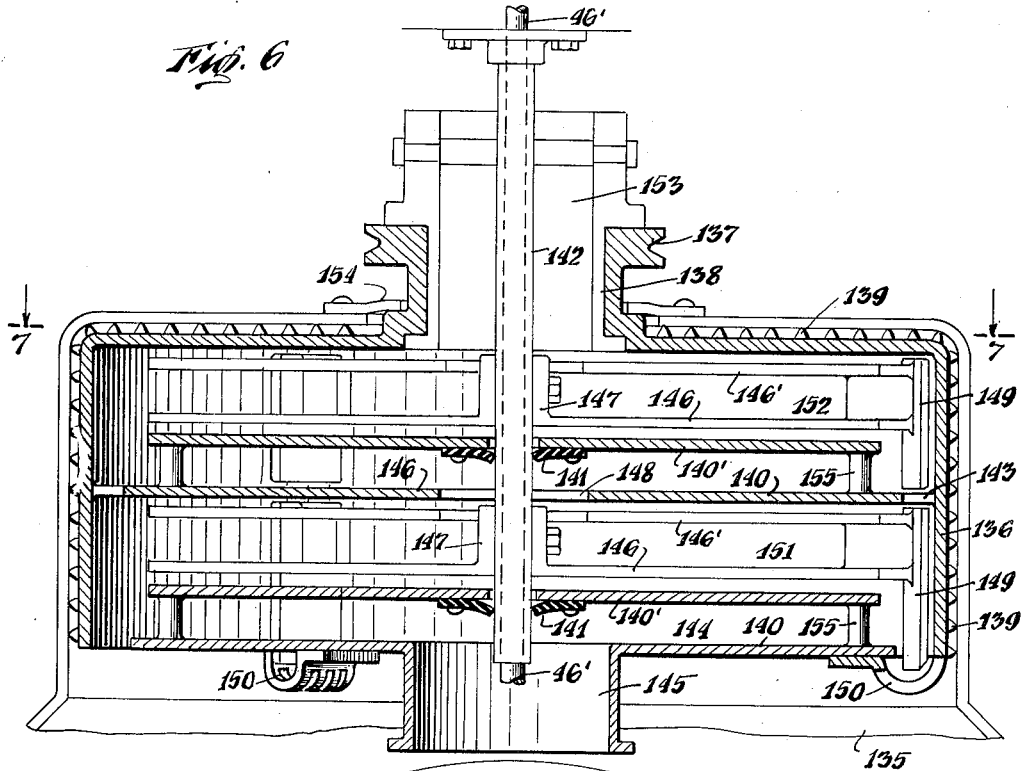
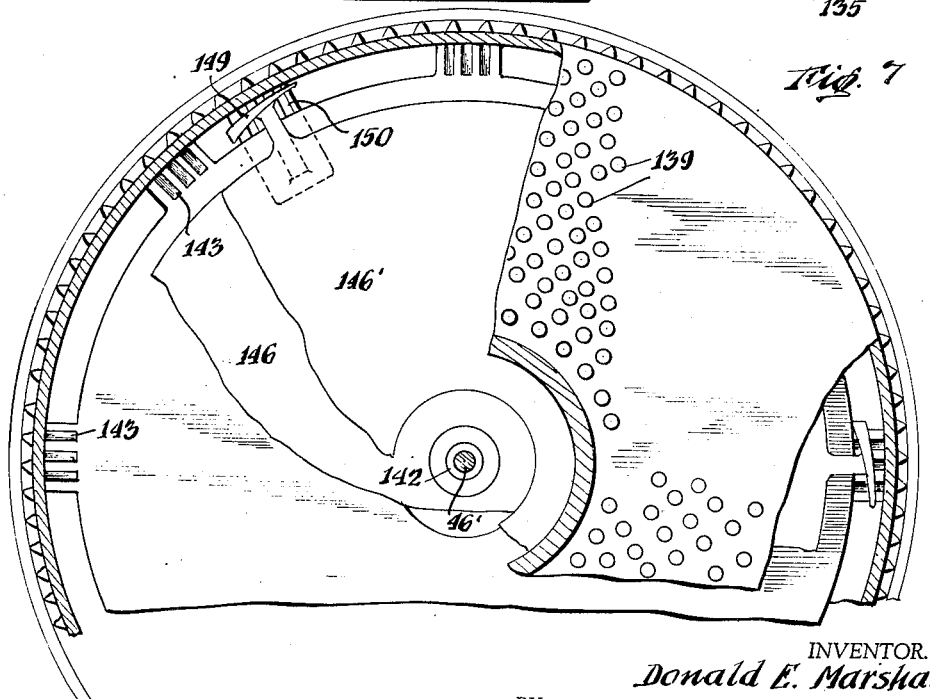
INVENTOR.
Donald E. Marshall
BY Ernest D. Given
ATTORNEY

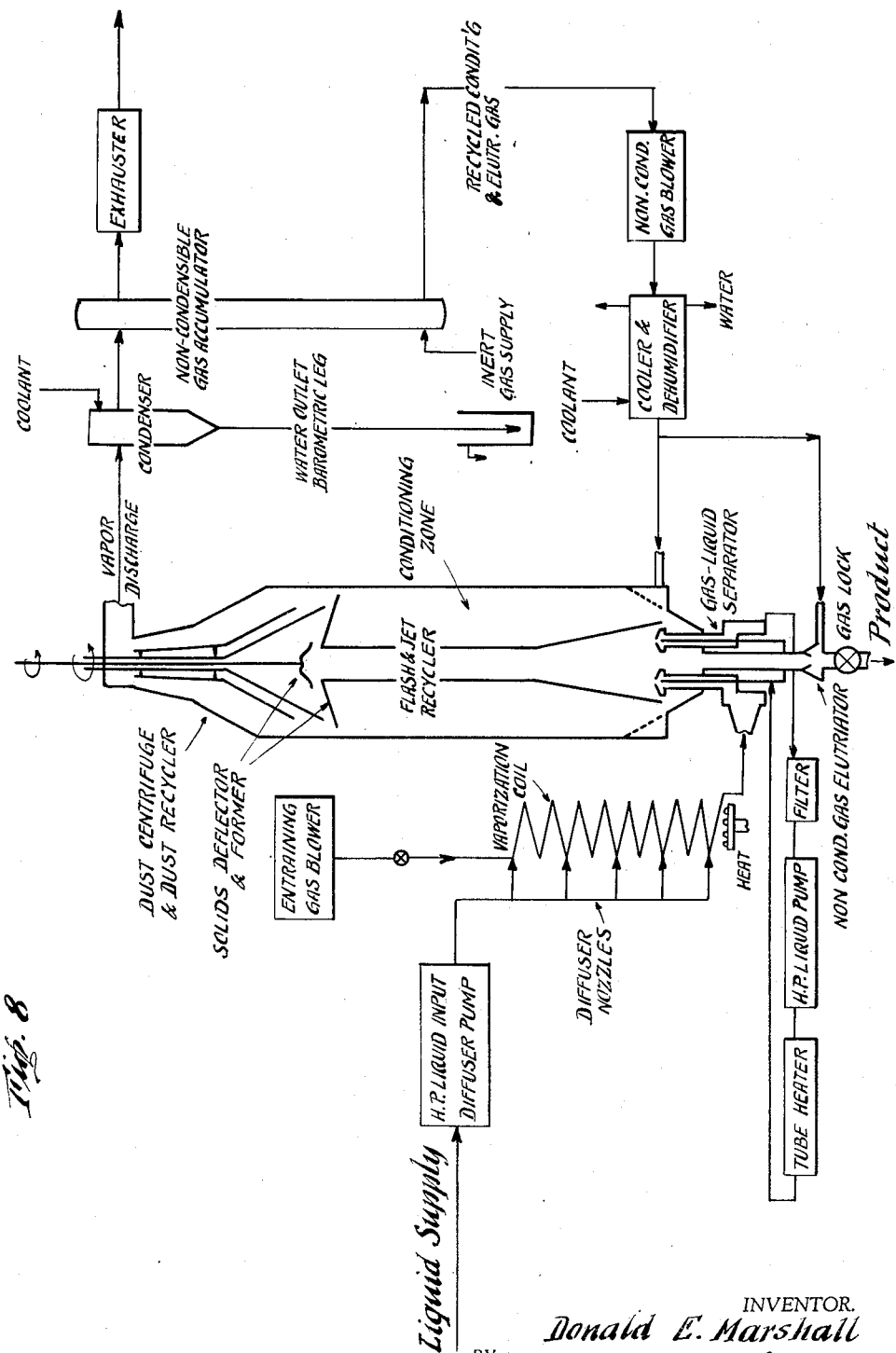

Patented July 24, 1951

2,561,394

UNITED STATES PATENT OFFICE 2,561,394

METHOD OF COATING PARTICULATE MATERIALS

Donald E. Marshall, Summit, N. J.

Application March 16, 1946, Serial No. 654,996

9 Claims. (Cl. 117—100)

This invention relates to a process and apparatus for vaporizing and separating the volatile portions of solutions or liquid mixtures which also contain solids or non-volatile liquids. The separated solids are nucleated into pellets and removed as a classified product.

The non-volatile liquid input is spread microscopically thin on carrier particles where it is solidified to add growth to the carrier particle, or in another case, spread microscopically thin upon the surface of inert or catalytic solid particle carriers to promote a chemical reaction in the liquid phase, which transforms the non-volatile liquid so spread, into volatile products of the reaction; vaporizes these and separates these vapors from the carrier particles. Certain coating solids resulting from this chemical reaction are removed with the carrier particles to regeneration or re-vivification zones.

In carrying out the invention such mixtures or solutions as detergents, milk, brewed coffee, soups and fruit juices are dehydrated more effectively than is possible by other known methods. Intensification of the conversion of water to vapors and separation of these vapors from the solids or product is accomplished in a manner which greatly lessens the destruction of flavors or keeping qualities of the product. Furthermore, the products or separated solids are pelleted and classified to a uniform size, density and structure.

This invention is adaptable to known advantages of low temperature negative pressure dehydration and because of the intensification of the treatment, produces superior results in economy of operation, size of equipment and character of product. The same is true of dehydration at normal pressures conducted in atmospheres of inert non-oxidizing carrier gases.

Another application of this invention is in separating volatile solvents from chemical solutions being converted to solid particles, such as final steps in the manufacture of plastic moulding granules. Here the intensification inherent in the process produces superior results, such as complete solvent removal, high capacity and efficiency in small units of apparatus, and uniform character of finished pellets.

Another advantage of this invention to chemical processing, is that of spreading non-volatile liquid-phase material microscopically thin upon inert or catalytic carrier particles while these particles are in complete gas suspension, virtually untouched by surrounding particles or walls and for a sufficient time to complete a chemical reaction in these liquid-phase films. This may be aided in some cases by the catalytic character of the carrier particle, and in all cases by the large surface area provided by the carrier particle stream. This chemical reaction, for example, may be the re-esterification of fatty-oils with methyl alcohol, thus yielding products of reaction such as methyl ester of fatty-oil and of glycerine which are both readily vaporizable. Then the separation of these vapors from the carrier solid particles and the fractional condensation of these gaseous products completes the process. Furthermore, such solids as those which discolor fatty-oils are collected as coating material on the carrier solid particles and these more heavily laden particles are removed for revivification during the recycling of these carrier particles.

With this invention rapid reactions in the liquid-phase can be greatly facilitated by conducting these liquid-phase reactions on the surfaces of carrier particles instead of much slower reactions and less complete reactions with liquids in bulk. The type of liquid-phase reactions which are suitable to being promoted by this invention are those which yield vaporizable products.

Among the advantages of this invention may be mentioned:

A. The "time-in-process" factor and "inventory-in-process" factor are minimized by taking advantage of the fact that input liquid is converted to high-velocity gas and solids streams, which are separated efficiently without need for large spray chambers.

B. The velocities of both gases and solid particles are sufficient to sweep the exposed surfaces of the reaction chamber clean.

C. The fact that the apparatus induces counterflow of solid particles mechanically, and reworks the smallest dust particle into finished pellets, thus intensifying the liquids-solids-gas contacting and separating them in small spaces.

D. Atomization of input stream is made efficient by volatilizing a large portion of the stream to serve as an entraining gas stream. Then centrifugal separation is effected and the remaining portion is pumped through a high pressure hydraulic atomizing circuit.

E. The mechanical separation and reversal for recycling of heavier solids portions of the material being processed in multi-stage so as to handle the main bulk as larger pelleted particles being compacted and tumbled by contact with spinning deflecting surfaces in the first stages and throwing out the dust in a manner that envelops it in the main recycling stream in the later stages. Both actions give high counter-flow velocity to the solids stream to intensify the sweeping of gases over the surfaces of these particles.

F. The input for ordinary spray or flash drying applications can be made entirely through a hydraulic pumping circuit and drying air introduced through the vapor circuit, thus eliminating the need for a liquid-gas centrifugal separator.

G. When the process is operated without an accumulated bed of recycled solids a free falling zone is provided for recycled solids, thus providing a method of nucleation very similar in its results and characteristics to the formation of hail stones in the air currents of a "Thunder-Head."

H. The up-flow of released input stream of material in a central sparger draft tube intensifies the solidification and confines it to a zone isolated from the conditioning zone where the falling particles are being recycled.

I. The revolving sparger tube provides advantages in keeping both inner surfaces of the chamber clean, as well as keeping its own inner surface swept clean.

J. When this process is operated at negative pressure the main vapor input stream is utilized to drive the sparger action, thereby avoiding the addition of entrainment gas load. The non-condensible gas stream used to partially condition recycled solids together with cooling jackets, together with using this non-condensible gas to accomplish gas elutriation at the outlet, is a matter of high velocity application of low density gas. The dust centrifuge is more effective because of higher differentials between the low density of gas and the density of solids, thus permitting higher gas velocities.

No extra loads are added to the exhausting system over conventional negative pressure dehydration, and the spray chamber is made compact for high evacuation, when necessary.

The invention may be understood from the description in connection with the accompanying drawings in which:

Fig. 1 is a vertical section through an illustrative embodiment of an apparatus for carrying out the invention;

Fig. 2 is a similar section on a larger scale partly broken away;

Fig. 3 is a section along the line 3—3 of Fig. 2;

Fig. 4 is a side view on an enlarged scale showing a portion of Fig. 1;

Fig. 6 is a vertical section showing another modification;

Fig. 7 is a section along the line 7—7 of Fig. 6;

Fig. 8 is a diagram or flow chart illustrating a way of carrying out the process.

Figures 5, 9:
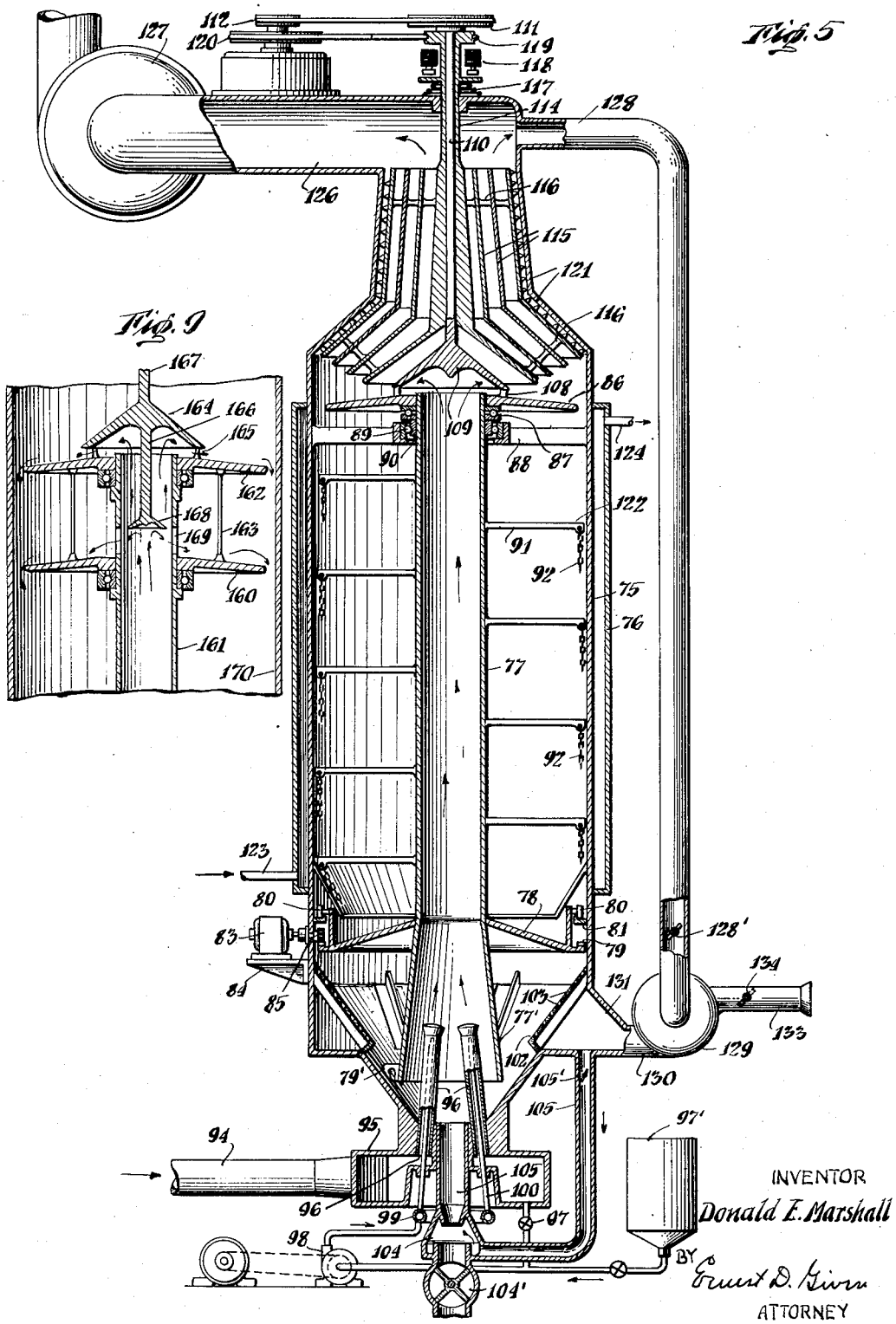
Fig. 5 is a longitudinal section showing a modification of the device.
Fig. 9 is a vertical section showing another modification.

In the drawings, reference character 1 indicates a chamber that has a sloping bottom wall 1'. The cylindrical portion of this chamber is jacketed by a jacket 2. An inlet 3 is provided for admitting cooling fluid to this chamber and an outlet 4 is provided for the fluid.

An annular perforated plate 5 that slopes downwardly towards its center is located in the chamber 1 and is spaced by spacers 5' a short distance from the bottom thereof. Pipes P for air under pressure enter the space between the plate 5 and bottom of container 1. The chamber 1 and jacket 2 are provided with spaced conically-shaped upper portions 6 and 7, respectively. An inlet 8 is provided for the space between the portions 6 and 7, and an outlet 9 is provided therefor.

An inlet 10 is provided for material to be treated. This inlet enters a toroid chamber 11 tangentially. A tangential outlet 12 (Fig. 3) is provided from the toroid chamber 11. A diverting plate 12' for liquid is provided at the entrance of this outlet 12. A high-pressure liquid pump 15 (Fig. 2) is provided into which the outlet 12 enters. A filter screen 16 is provided in this outlet. An outlet 17 extends from the pump 15 to a heat exchanger 18 that is provided with heating tubes 19. A connection 20 extends from the heat exchanger 18 to a bustle 21 surrounding an outlet tube 22 which is concentric with the chamber 11. A smaller tube 23 (Fig. 1) is located concentric with the tube 22 and extends to the upper end of the cylindrical portion of chamber 1. A plurality of upwardly-extending and inwardly inclined small tubes 24 (Fig. 2) extend from the bustle 21 into the lower portion of chamber 1. These tubes terminate in nozzle tips 34. A ring 26 integral with the bottom 1' is provided around the tubes 29 and has set screws 27 for holding these tubes in assembled relation. The tubes 24 extend through tubes 29. A radial, horizontal, inward, tubular extension 30 of the chamber 11 connects with the vertical tubes 29 which surrounds the tubes 24. Tubes 24 extend from the bustle 21 almost to the upper ends of the tubes 29 and have tight fits in the lower portion of these tubes 29, leaving spaces 33 around the tubes 24 from the extension 30 to the upper ends of these tubes, thus providing passageways for gases which enter the chamber 11. Nozzle tips 34 are provided at the upper ends of the tubes 24. Openings 35 are provided through the tubes 29 to establish communication with the chamber 11 through the tubular extensions 30 and the spaces 33 between the tubes 24 and 29.

Brackets 38 (Fig. 1) are provided on the perforated plates 5 to support a large tube 39 with which the inlet tube 23 for solid particles is concentric.

A bearing 40 is provided for balls 41 and is securely attached to the outside of the tube 39 near its upper end. A slightly conical plate 42, having an opening at its center through which the tube 39 extends, is provided with a ball race near said opening which rests upon the balls 41. A deflection plate 43 is rigidly attached by connectors 44 to the conical plate 42. Its lower surface curves upwardly and outwardly from a central point and thence downwardly and outwardly to its edge. A projection 45 at the center of the upper side of the deflection plate 43 is securely attached to the end of a shaft 46 which is driven by motor 47, pulley 48, belt 49 and pulley 50. The balls 41 and bearing 40 support these parts.

Nested conical plates 51, 52, 53 and 54 are supported and driven by hollow shaft 57, pulley 58, belt 59, pulley 60 and motor 47. These plates are securely connected together by connectors 61 and the lower portions of these plates are more nearly horizontal than the upper portions thereof. Projections 62 and 63 are provided along the inclined portions of the lower side of plate 51 and the upper side of plate 54 to prevent the adjacent spaces from becoming clogged. A vapor outlet O is provided above the conical plates 51 to 54.

A spring 64 is provided with its lower end resting on a bearing on plate 65 that is fixed in position. This spring 64 normally keeps the plates 51—54 in their uppermost position. Sleeve 67 integral with hollow shaft 57 surrounding shaft 46 is connected to the pulley 58 and a flange at the bottom thereof is pressed upwardly by the spring 64. Magnetically-operated or other sorts of hammers 70 are attached to the supports 71 on the bracket 72.

In the modification shown in Fig. 5, a chamber 75 is provided with a jacket 76. An upright revoluble tube 77 extends centrally of the chamber 75 and has a conical lower end 77'. A spider 78 is attached to the lower portion of the tube 77. A driving ring gear 79 is attached to the outer ends of spider 78. This ring gear 79 is provided with rollers 80 which rest on a runway 81 that is attached to the inside of the chamber 75. The ring gear 79 is driven by a gear on motor 83 which rests upon a support 84 outside of the jacket 76. A packing gland 85 is provided for the shaft of the motor 83. A scraper 79' fastened to tube 77 revolves to clear space around the lower end of tube 77.

Centering arms 88 are attached to the chamber 75 for centering the tube 77. A roller bearing 89 is provided between the inner ends of the arms 88 and the bearing ring 90 that is attached to the outside of the tube 77. Radial arms 91 are attached to the tube 77 and carry chains 92 suspended from their outer ends.

A tangential inlet 94 is provided for material to be treated when it enters separator 95. Outlet tubes 96 for vapors extend from the separator 95 into the tube 77. A valved outlet 97 for liquids extends from the separator 95 to the pump 98 by which these liquids are forced into a ring tube 99 from which the tubes 100 extend into and nearly to the upper ends of the tubes 96 which lead from the upper side of the separator 95, leaving an annular space between the inside of the tubes 96 and the outside of the tubes 100.

Valved outlet 97 is also connected to supply tank 97' as an alternate source for supplying liquid to pump 98.

Conical plate 86 is revolvably mounted on the open end of tube 77 and studs 108 connect the disk 86, which is a pelleting plate, to the pelton reflector cup 109. A shaft 110 is provided with a pulley 111 which is driven by a pulley 112 on a motor 113.

A hollow shaft 114 is mounted on the shaft 110. The shaft 114 carries a conically-shaped dust vane assembly consisting of concentric cones 115 that are held in assembled position by spacers 116.

A spring 117 is provided to keep this cone assembled in its uppermost position, but is permitted to be vibrated when struck by electromagnetic hammers 118. A pulley 119 that is smaller than the pulley 111 is driven by a pulley 120 of motor 113, which is larger than the pulley 112. Cleaning pins 121 are provided along the outer surface of the outer vane 115.

The jacket 76 around chamber 75 is provided with an inlet 123 and an outlet 124 for heating or cooling the chamber 75, as needed. An exhaust pipe 126 for vapor bearing air leads from the upper portion of the dust centrifuge 115 to an exhaust fan 127. A recycling exhaust duct 128 leads from above the dust centrifuge to a re-circulating fan 129, a valve 128' being provided in this pipe. An outlet 130 extends from the fan 129 to a plenum chamber 131 that surrounds the conical bottom of chamber 75 and tangential inlets 102 with baffles 103 open from the chamber 131 into chamber 75. A pipe 133 for auxiliary fresh air is provided for the fan 129 and a damper 134 is located in this pipe. A branch air line 105 from fan 129 provides elutriating air stream to annular opening 104 surrounding outlet 105 and valve 105' regulates this air. The air lock 104' discharges the products from chamber 75.

A modified dust centrifuge is shown in Figs. 6 and 7, a chamber 135 is provided from which vapors entraining solids or dust are to be exhausted. A casing 136 is provided at the upper portion of the chamber 135. This casing 136 is to be revolved at a high speed. A pulley 137 is provided for revolving the casing 136. A bearing 138 is provided in which the pulley 137 revolves. Cleaning points or projections 139 are provided along the outside of the casing 136 to prevent dust from caking between the chamber 135 and the casing 136.

The revolving casing 136 is provided with attached disks 140 sealed by glands 141 from the stationary supporting shaft 142. The disks 140 support other disks 140' by studs 155 and are attached by vanes 143 to the casing 136. Revolving disks 140 and 140' provide an air passage 144 leading from inlet 145 to outer periphery of disks 140. A centrifugal air-flow is developed when disk 140 and casing 136 revolve.

Stationary disks 146 and 146' supported on shaft 142 by hubs 147 provide an air by-pass 151 from outer periphery of revolving disks 140 in the first stage to axial passage 148 which is the entrance to the second stage.

Integral with stationary disks 146 are mounted scrapers 149 arranged to plough collected dust from the inner surface of casing 136. Scrapers 149 are pitched so as to move ploughed dust downwardly from the second stage to the first stage through the openings between the vanes 143. Vanes 143 are also pitched to assist in transfer of dust between ploughs 149 of each stage.

Vanes 150 along the outer circumference of the bottom stage also are pitched to propel the dust from the centrifuge down along the wall of chamber 135. The uppermost stage of centrifugal disks 140 deliver through stationary passage 152 to outlet 153. Chamber 135 is sealed from revolving casing 136 by gland 154.

Stationary hollow support 142 provides for shaft 46' which corresponds to shaft 46 in Fig. 1.

In the modification shown in Fig. 9 a multiple deflector and tumbling device is illustrated. The lower conical plate 160 is revolubly supported on draft tube 161 and is attached to the upper conical plate 162 by stay rods 163. The deflector 164 is driven by means not shown and drives the whole assembly through studs 165. An extension shaft 166 integral with drive shaft 167 supports a lower and partial deflecting cup 168. Openings 169 in the wall of tube 161 provide spaces for deflected material to be thrown out on lower conical plate 160 for pelleting.

The operation of the invention in accordance with the several embodiments described above can be performed using liquid input material carrying solids in suspension or solution. The operation will be particularly described in detail in connection with one of the embodiments of the apparatus described above. From this description it will be obvious how the invention can be practiced by using the other apparatus or devices that have been described.

The preparation of the material to be treated may be carried out as shown diagrammatically in Fig. 8. The liquid mixture or solution or composition to be treated is introduced by a high pressure liquid diffuser pump which atomizes the material at the diffuser nozzles into the vaporization coil. Heat is added to the input liquid and entraining gas and to the vapors and liquids in the vaporization zone. The vapors are allowed to expand in the vaporization coil and supplement the entraining gas to develop a high-speed input stream to supply inlet 10 (Fig. 1). The input material enters inlet 10 partially in gas phase and partially in liquid phase in which solids may or may not be suspended.

Toroid chamber 11 (Fig. 1) serves as a centrifugal separator. The gases or vapors fan out through tubular extensions 30 (Fig. 2) through annular spaces 33 to form a cylindrical envelope around the atomizing nozzle tips 34.

The liquids pass out of outlet 12 through filter 16 to high pressure liquid pump 15 and tubular heat exchanger 18 and bustle 21 thence out through tubes 24. This liquid is atomized by hydraulic pressure induced by pump 15 at nozzle tips 34 inside of the incoming vapor streams.

The vapor and atomized liquid input stream emanating from nozzles 29 and 24 develop an upward jet induced conveyor stream in sparger or draft tube 39 around solid particle input tube 23.

Within this tube 39 the temperature is lowered by flashing of unvaporized input, by the cooling air streams from the elutriator below and by conduction from recycled solid particles so as to congeal the solidifiable material in the input stream. Atomized liquid-phase material coats the recycled solid particles and is carried on the surfaces to assist in nucleation of dust on recycled solid particles and to condition particles for pelleting and forming. Previously formed solid particles from multi-stage process can be introduced through tube 23.

The upward flowing gas and solids stream in tube 39 is deflected by the spinning surface 43 which propels the heavier particles out and down in a counter flowing direction to separate them from the lighter dust and gases.

The deflected solid particles are tumbled on the spinning plate 42 to shape and compact them into pellets. Also, the centrifugal forces propel these pellets out and down the wall of the chamber 1 forming a barrier between the outer circumference of plate 42 and the chamber wall of the propelled solid particles which bounds the conditioning zone below.

The accumulated bed of deflected solid particles below this barrier is conditioned by cooling and drying gas introduced through inlets P. Violent aeration of this bed of accumulated solid particles is possible for conditioning and classification without serious loss of solids through the barrier of counter flow solids above, yet allowing the gases to discharge.

The accumulated bed of aerated solids flows or is induced into jet conveyor stream up tube 39 to be re-coated with input liquid or nucleated with smaller particles.

An elutriating gas stream is introduced to the lower end of discharge tube 22 and emerges at 22′ (Fig. 2) to supplement the streams from nozzles 34 passing upwardly through tube 39.

The recycling particles are classified at the bottom of the chamber 1. The lighter are swept up the draft tube 39 and the heavier particles which tend to collect along the surface of the plate 5 fall down counter to the elutriating gas stream from tube 22 and are discharged out through the lower end of tube 22, according to predetermined size balanced with elutriating gas flow.

The lighter dust and gases which separate from the deflected solids stream on plate 42 are swept upwardly to dust centrifuge and outlet "O." The spinning vanes 51—54 of the centrifuge develop a friction with escaping gases and induce a centrifugal flow which throws out the entrained dust particles to the outer circumferences of the spaces between vanes 51—54 and deposit their dust on these surfaces by centrifugal force. The hammering mechanism 70 jars the spinning vane assembly 51—54 in a manner which dislodges the accumulated solids or dust particles and causes them to move by gravity and centrifugal force down and off of the outer periphery of these vanes. These dislodged accumulations are propelled directly into the recycled main solids stream from plate 42 and become trapped below the barrier of counter flowing solid particles and thence is recycled with the solids stream to be nucleated into larger particles.

The gases induced by an exhausting fan similar to the one shown as 127 in Fig. 5 pass through the dust centrifuge and are discharged dust-free from the chamber.

It is obvious that with this apparatus high velocities of gas flow and hence intensified evaporation is accomplished in a compact chamber by virtue of the counter inertia imparted to the separated solids by the mechanical forces of the spinning deflector plates and vanes which develop centrifugal forces several times that of gravity to counteract the entrainment of high velocity gas flow.

In the modification of the invention shown in Fig. 5 the recycled particles are allowed to fall freely below the recycling barrier through a conditioning zone where recycled gases are taken from exhaust through duct 128 and introduced at the bottom of chamber 75 in cyclonic direction through inlets 132 and by baffles 103. Cooling air or drying air may also be introduced through inlet 133 to properly condition the particles in their fall.

No accumulation of recycled particles is permitted at the bottom of the chamber 75 and the interior walls are swept clean by chain drags 92. The elutriating gas is supplied through duct 105 from blower 129 and to the discharge duct 105. The proper sized particles fall counter to the elutriating gas and out through the air lock 104′.

This modified apparatus and process holds solid particles in free gas suspension throughout most of their travel and develops nucleated particles in a manner similar to the steps in formation of hail stones in nature wherein rain drops are carried in strong up drafts to a cold zone, congeal and fall only to be caught in another up draft where more rain accumulates and solidifies until the hail stones become heavy enough to fall to the earth despite the strong upward air current.

Conventional spray-drying or flash-drying can be practiced in this modified form of apparatus by introducing all of the liquid being treated from supply tank 97′ to liquid pump 15 and heating in tube heat exchange 18 as shown in Fig. 1 and atomizing the whole input at nozzle tips 34 (Fig. 2) enveloped in a cylindrical high velocity hot air stream from tubes 29 having been supplied through duct 10.

A modification of deflecting and forming mechanism is illustrated in Fig. 9 showing how two or more barriers of recycling solids can be obtained by using two or more deflectors 164 and 168. Deflector 168 throws out a portion of the upward input stream and allows the balance to pass to the second deflector 164. Both spinning conical plates 160 and 162 develop a solids stream barrier between their peripheries and the chamber wall 170 through which conditioning gases must pass to escape.

Negative pressure operation can be described by reference to Fig. 8. Input liquid is atomized into the vaporizing coil and at negative pressure and with the aid of some heat a gas stream is developed without the aid of auxiliary entraining gas. In other respects the input systems operate the same with the input streams being induced by the exhauster. The reaction zone operates the same way except that higher velocities of gas must make up for lower mass of gas in order to convey the solid particles upwardly.

The exhausted vapors are condensed by cooling and water is removed down a barometric leg. The non-condensible gases pass to an accumulator and out through exhausting ejector or vacuum pump. Conditioning gas is recycled through cooler de-humidifier and is introduced into the bottom of conditioning zone in a manner that conditions falling particles for recycling. Since these non-condensible gases are of low mass at negative pressure it is best not to attempt to aerate a bed of these accumulated solid particles. The elutriating gas supply is taken from the recycled non-condensible gas stream and may serve to cool and support larger particles to some extent, but here again the mass of gas must be offset by high velocity which adds a jet to draft tube conveying particles to top of chamber.

These high velocity gases will have less tendency to entrain dust from chamber due to larger differential in mass between gas and particle so that the same centrifugal forces will accommodate higher gas velocities of a lighter gas. Since no entrainment gas is introduced and the expanded vapors furnish the gas streams required to convey particles up the draft tube, no additional load is placed on the exhausting system over that required by a conventional vacuum spray drier, yet the surface exposure and particle formation and small reaction chamber gives many advantages in economy and quality of finished product.

I claim:

1. A process of treating a liquid mixture containing solid matter dissolved or suspended therein in order to recover the solid matter in divided form which comprises: continuously heating the mixture under pressure and passing it in an upward path at a high velocity, coincidently and continuously passing gaseous material at high velocity in an upward path surrounding the flow of said mixture and jetting said gaseous material into a contact zone in the form of a cylindrically shaped stream, continuously and coincidently atomizing said mixture within said cylindrically shaped stream, whereby said gaseous and atomized streams traverse the contact zone in intermingled form and at a high velocity, said atomized stream comprising solid particles and volatile material, separating at the upper end of the contact zone solid particles from gaseos and volatile material, continuously removing said gaseous and volatile material, collecting the solid particles in an aerating zone and continuously aerating them with an aerating gas, continuously recycling aerated particles from the aerating zone to the contact zone where they are picked up in the said upwardly flowing high velocity intermingled streams by means of the jet action and coated in said streams, continuing the process as above described to coat the solid particles until they are of such size that upon passage to the contact zone they fall out thereof instead of being picked up in said intermingled streams, and continuously removing said falling solid particles from the lower end of the contact zone as product.

2. A process of treating a liquid mixture containing non-volatile material including solid matter of relatively low solidifying point in order to reduce the non-volatile material to compact, uniformly sized pellets of different classifications which comprises: continuously diffusing the mixture in atomized form and in the presence of an entraining gas through a heating zone at a high velocity to melt said low solidifying solid matter, separating gaseous material therefrom and continuously passing said gaseous material upwardly at high velocity in the form of a plurality of cylindrically shaped gaseous streams to a contact zone, continuously passing the non-volatile material upwardly at high velocity and atomizing it within each of said cylindrically shaped gaseous streams, whereby a jet action is developed between said gaseous and atomized streams and they traverse the contact zone in intermingled form and at a high velocity, deflecting said intermingled streams at the upper end of the contact zone in a generally outward and downward direction to knock down and separate non-volatile material including any solidified particles from gaseous material, abruptly checking the downward flow of the non-volatile material and any solidified particles while coincidently tumbling and centrifuging them, whereby solidified particles tend to become shaped to a pellet form, passing the non-volatile material and solidified particles to an aerating zone wherein they are aerated, recycling the products from the aerating zone to the contact zone where they are picked up in said upwardly flowing high velocity intermingled streams by virtue of said jet action, said solidified particles being coated by solidifiable particles in said intermingled streams, continuing the process as above described to shape and coat solidified particles until they are of such size that upon entry into the contact zone they fall out thereof instead of being picked up by said intermingled streams, and continuously removing the separated gaseous material.

3. A process in accordance with claim 2 in which a cooling elutriating gas is introduced to the lower end of the contact zone.

4. A process of treating a liquid mixture containing solid matter dissolved or suspended therein and to reduce the solids to compact, uniformly sized pellets of different classifications which comprises: continuously passing the mixture in atomized form through a heating zone at a high velocity to vaporize volatile material, separating the vaporized material and continuously passing it upwardly at high velocity in the form of a plurality of cylindrically shaped vaporous streams to and through a contact zone, continuously reheating and passing the unvaporized material upwardly at high velocity and atomizing it within each of said cylindrically shaped vaporous streams, whereby said vaporous and atomized streams traverse the contact zone in intermingled form and at a high velocity, said atomized streams comprising liquid and solid particles, deflecting said intermingled streams at the upper end of the contact zone in a generally outward and downward direction to knock down and separate unvaporized from vaporous material, abruptly checking the downward flow of the unvaporized material while coincidently tumbling and centrifuging it, whereby said solid particles tend to become shaped to a pellet form, passing the unvaporized material including solid particles to a zone adjacent and surrounding said contact zone, continuously recycling the products from said adjacent zone to the contact zone wherein lighter particles are picked up by the said upwardly flowing high velocity intermingled streams and heavier particles fall out thereof and are removed, and continuously removing the separated vaporous material.

5. A process of treating a solution containing solidifiable matter dissolved or suspended therein to reduce such matter to compact discrete particles comprising the steps of atomizing within a closed chamber a solution containing solid particles within a sleeve of entraining gas, directing the atomized stream of solution and entraining gas upwardly within a confined central zone thereby generating a jet action within said zone, said solid particles being formed by solidifying from said solution during said jet action, carrying upwardly in said zone in suspension in said gas said solidified particles, separating the solidified particles from vapors and entraining gases by directing the atomized stream from the central zone against a downwardly deflecting surface, arresting the fall of said separated particles and projecting said arrested particles outwardly by centrifugal force and then downwardly into a zone surrounding said confined central zone, passing an aerating gas upwardly through the particles in said surrounding zone, returning a portion of the aerated particles to said central zone for recycling by means of said jet action, discharging a portion consisting of the heavier particles from said chamber, and removing separated vapors and gases from said chamber.

6. A method of contacting a liquid containing solidifiable material with gaseous material in a system within a chamber comprising the steps of introducing liquid to the bottom of said chamber, coincidently introducing gaseous material to the bottom of the chamber in a path concentric to that of the liquid, passing the liquid in suspension in the gaseous material upwardly through a confined central zone in said chamber by gas jet action; passing the effluent products from the central zone into a deflecting zone where non-gaseous products including solidified particles are separated from gaseous products, passing the solidified particles downwardly into a zone adjacent and surrounding said central zone, fluidizing the particles in said adjacent zone by introducing fluidizing gas thereto, said fluidizing gas after leaving the said adjacent zone serving to aid in removing said gaseous products from the chamber, passing fluidized particles to the inlet of said central zone to be caught up by means of said jet action and transported therethrough in said suspension, said particles being coated by said suspended liquid in the central zone, separating the effluents from the central zone as before, and repeating the foregoing steps until the particles are so coated that they are not caught up and transported in said suspension but fall downwardly through said central zone.

7. A process of treating a liquid feed containing non-volatile material including solid matter of relatively low solidifying point in order to reduce the non-volatile material to compact particles which comprises: continuously passing the feed in atomized form through a heating zone at a high velocity to volatilize a part of said feed and to melt said low solidifying solid matter, separating volatile material from non-volatile material and continuously passing the former upwardly at high velocity in the form of a plurality of streams to a contact zone, continuously passing the non-volatile material upwardly at high velocity and atomizing it within each of said streams, whereby a jet action is developed between said volatilized and atomized streams and they traverse the contact zone in intermingled form and at a high velocity, separating said intermingled streams at the upper end of the contact zone into volatile material and non-volatile material including any solidified particles, continuously removing the separated volatile material from the upper end of said contact zone, passing the non-volatile material and solidified particles to a fluidizing zone surrounding said contact zone, fluidizing the particles in the fluiding zone by introducing fluiding gas to the lower portion of the same, continuously passing fluidized particles from the latter zone to the inlet of said contact zone where they are picked up by virtue of the jet action of said upwardly flowing high velocity intermingled streams, said solidified particles being coated by the non-volatile and solidifiable material in said intermingled streams, continuing the process as above described to coat solidified particles until they are of such size that upon reentry into the contact zone from the fluidizing zone they fall out thereof instead of being picked up by said intermingled streams.

8. A process of treating a liquid mixture containing solid matter dissolved or suspended therein in order to recover the solid matter in finely divided form which comprises: continuously heating the mixture under pressure and passing it in an upward path at a high velocity, coincidently and continuously passing gaseous material at high velocity in an upward path surrounding the flow of said mixture and jetting said gaseous material into a contact zone in the form of a cylindrically shaped stream, continuously and coincidently atomizing said mixture within said cylindrically shaped stream, whereby said gaseous and atomized streams traverse the contact zone in intermingled form and at a high velocity, said atomized stream comprising solid particles and volatile material, deflecting said intermingled streams at the upper end of the contact zone in a generally outward and downward direction to knock down and separate solid particles from gaseous and volatile material, checking the downward flow of the solid particles while coincidently tumbling them outwardly of the upper end of said zone in order to shape the particles to pellet form, passing the particles to an aerating zone concentric with the contact zone and below the said upper end thereof, continuously introducing aerating gas to the lower portion of the aerating zone to aerate the particles therein, passing a portion of the aerated particles to the lower end of the contact zone to be picked up by the said upwardly flowing high velocity intermingled streams, withdrawing a portion as product, and utilizing the aerating gas leaving the aerating zone to help remove said separated gaseous and volatile material.

9. A process of treating a liquid mixture containing solid matter dissolved or suspended therein in order to recover the solid matter in the form of particles which comprises: continuously atomizing the mixture into a heating zone at a plurality of inlets and at a high velocity, passing an entraining gas into the heating zone to entrain the atomized mixture, separating the entrained mixture beyond the heating zone into gaseous material and non-volatile material, continuously passing the gaseous material upwardly at high velocity in the form of a plurality of streams to and through a contact zone, continuously and coincidently passing the non-volatile material upwardly at high velocity and atomizing it within each of said streams, whereby said gaseous and atomized streams traverse the contact zone in intermingled form and at a high velocity, deflecting said intermingled streams at the upper end of the contact zone in a generally outward and downward direction to separate gaseous material from non-volatile material including solid particles formed from said mixture, passing the non-volatile material and solid particles to a zone concentric with the contact zone to promote the coating of the solid particles by the non-volatile material, aerating the particles in said concentric zone by introducing aerating gas thereto, recycling aerated particles from the concentric zone to the contact zone where they are picked up by the said upwardly flowing high velocity intermingled streams, continuing the process as above described to coat the solid particles until they are of such size that upon reentry into the contact zone they fall out thereof instead of being picked up by said intermingled streams, and utilizing aerating gas leaving the concentric zone to help remove the separated gaseous material.

DONALD E. MARSHALL.

REFERENCES CITED

The following references are of record in the file of this patent:

UNITED STATES PATENTS

| Number | Name | Date |
|---|---|---|
| 410,067 | Bower | Aug. 27, 1889 |
| 1,078,848 | Gray | Nov. 18, 1913 |
| 1,157,935 | Gray | Oct. 26, 1915 |
| 1,601,898 | Wiley et al. | Oct. 5, 1926 |
| 1,847,009 | Kollbohm | Feb. 23, 1932 |
| 1,854,100 | Brito | Apr. 12, 1932 |
| 1,859,992 | Seil | May 24, 1932 |
| 1,874,150 | Anger | Aug. 30, 1932 |
| 1,894,623 | Lissman | Jan. 17, 1933 |
| 2,054,441 | Peebles | Sept. 15, 1936 |
| 2,192,515 | Crane et al. | Mar. 5, 1940 |
| 2,297,726 | Stephanoff | Oct. 6, 1942 |
| 2,339,932 | Kuhl | Jan. 25, 1944 |
| 2,357,649 | Hall | Sept. 5, 1944 |
| 2,431,455 | Blanding | Nov. 25, 1947 |
| 2,447,005 | Gamson | Aug. 17, 1948 |
| 2,447,006 | Gamson | Aug. 17, 1948 |